(12) United States Patent
  Blank et al.

(10) Patent No.: US 8,762,246 B2
(45) Date of Patent: Jun. 24, 2014

(54) SYSTEM AND METHOD FOR OPTIMIZING COLLATERAL MANAGEMENT

(75) Inventors: Brian Blank, Manalapan, NJ (US); Bryan Chan, East Meadow, NY (US)

(73) Assignee: The Bank of New York Mellon, New York, NY (US)

( * ) Notice: Subject to any disclaimer, the term of this patent is extended or adjusted under 35 U.S.C. 154(b) by 0 days.

(21) Appl. No.: 13/362,980

(22) Filed: Jan. 31, 2012

(65) Prior Publication Data
  US 2012/0259796 A1    Oct. 11, 2012

Related U.S. Application Data

(60) Provisional application No. 61/438,195, filed on Jan. 31, 2011.

(51) Int. Cl.
  *G06Q 40/00*    (2012.01)
(52) U.S. Cl.
  USPC ................................. 705/36; 705/37
(58) Field of Classification Search
  USPC ...................................... 705/36, 37
  See application file for complete search history.

(56) References Cited

U.S. PATENT DOCUMENTS

| 2003/0033240 | A1* | 2/2003 | Balson et al. ................... 705/37 |
| 2007/0233594 | A1* | 10/2007 | Nafeh ............................. 705/37 |
| 2010/0030705 | A1* | 2/2010 | Tharmananthar et al. ... 705/36 T |

* cited by examiner

*Primary Examiner* — Harish T Dass
*Assistant Examiner* — Siegfried E Chencinski
(74) *Attorney, Agent, or Firm* — Pillsbury Winthrop Shaw Pittman LLP

(57) ABSTRACT

A computer-implemented system and method for managing collateral allocations associated with Tri-Party repurchasing agreements and a collateral allocation system includes one or more processors and memory/database configured to store user-definable rulesets and collateral characteristics relating to the Tri-Party repurchasing agreements. A collateral allocation module recalls collateral from the Tri-Party repurchasing agreements to a common Dealer Box, and reallocates the collateral to the Tri-Party repurchasing agreements utilizing a self organizing map, so as to minimize margins to reduce over-collateralization and/or undercollateralization. Other considerations, such as basket identifiers and cost of carry considerations may be weighed in the reallocation as well.

20 Claims, 11 Drawing Sheets

BEFORE MAXIMAL ALLOCATION

Iter 0:

| | SA | DB | AS | Collateralized |
|---|---|---|---|---|
| R1 | 0 | 13 | 0 | N |
| R2 | 0 | 16 | 0 | N |
| R3 | 0 | 15 | 0 | N |
| R4 | 0 | 12 | 0 | N |
| R5 | 0 | 14 | 0 | N |
| R6 | 0 | 6 | 0 | N |
| R7 | 0 | 5 | 0 | N |
| R8 | 0 | 10 | 0 | N |

Dealer Box (DB):
S1  S2  S3  S4  S5
S6  S7  S8  S9  S10
S11 S12 S13 S14 S15
S16 S17 S18 S19 S20
S21 S22 S23 S24 S25

Allocated Securities (AS): (empty)

AFTER MAXIMAL ALLOCATION EXECUTION

Iter 1:

| | SA | DB | AS | Collateralized |
|---|---|---|---|---|
| R7 | 2 | 1 | 2 | Y |
| R6 | 4 | 0 | 2 | N |
| R8 | 3 | 0 | 7 | N |
| R4 | 3 | 3 | 7 | Y |
| R1 | 2 | 4 | 7 | Y |
| R5 | 3 | 5 | 6 | Y |
| R3 | 2 | 5 | 8 | Y |
| R2 | 1 | 0 | 15 | N |

Securities per row:
R7: S1 S3
R6: S2 S5 S6 S8
R8: S10 S11 S13
R4: S14 S17 S19
R1: S19 S20
R5: S20 S22 S23
R3: S24 S25
R2: S25

Dealer Box (DB):
S4  S9  S15
S7  S18
S12
S16
S21

Allocated Securities (AS):
S1  S2  S3   S5   S10
S6  S8  S13  S14
S11 S17 S19  S20
    S22 S23 S24  S25

AFTER REPLACEMENT ALGORITHM EXECUTION

Iter 2:

| | SA | DB | AS | Collateralized |
|---|---|---|---|---|
| R6 | 5 | 0 | 1 | Y |
| R8 | 3 | 0 | 7 | Y |
| R2 | 1 | 0 | 15 | Y |
| R7 | 2 | 1 | 2 | Y |
| R4 | 3 | 3 | 7 | Y |
| R1 | 1 | 4 | 7 | Y |
| R5 | 3 | 5 | 6 | Y |
| R3 | 2 | 5 | 8 | Y |

Securities per row:
R6: S2 S5 S6 S8 S19
R8: S10 S11 S13 S14 S23
R2: S25 S3
R7: S1 S17
R4: S20 S12 S15
R1: S22 S4 S9 S16
R5:
R3: S7

Dealer Box (DB):
S18
S21

Allocated Securities (AS):
S1  S2  S3  S4  S5
S6  S7  S8  S9  S10
S11 S12 S13 S14 S15
S16 S17           S19 S20
    S22 S23 S24 S25

SA — NUMBER OF SECURITIES ALLOCATED TO A REPO ACCOUNT IN A PARTICULAR ITERATION
DB — ELIGIBLE SECURITIES IN THE DEALER BOX
AS — ELIGIBLE SECURITIES IN THE ALLOCATED SECURITIES BOX

FIG. 3

☐ BNY Mellon - Broker Dealer Services - GCM - Customers    ▬ ⊡ ×

Modify V3 CPO Allocation Template

Template Name XXXX XXX XXXX ← B

Pre - Optimization Phase
MINMOD [YES ▼] ← C    Minimum Modifications made to Accounts associated with MINMOD tag.

Optimization Phase
| | | |
|---|---|---|
| FFSFAC | [NO ▼] | Forced Fussy Factor controls how strictly the previous option (FUSFAS) should be enforced. |
| FULREP | [NO ▼] | Full Replacement controls the number of passes that would run in Full Replacement Algorithm. |
| FUSFAC | [25 ▼] ← D | Fussy Factor controls the percentage of a position that gets allocated in each iteration. |
| IMNMOD | [NO ▼] | Include Minimum Modification (MINMOD) flagged accounts in Replacement Algorithm. |
| MXNOPOS | [YES ▼] | The Maximum Number of Positions that can be used for allocation. |
| REPSRT | [NONE ▼] | Should the Replacement algorithm run the Deals with older start date option (ISHPRI) or the Deals with a lower priority option (SHPRIO). |
| RETRY | [2 ▼] | Number of times to Retry Optimization & Post-Optimization Phases. |

Post - Optimization Phase

Section 1 - Parameter that decide which deals should be left short if there is insufficient eligible collateral available in the Dealer Box.

| | | |
|---|---|---|
| BASKET | [1 ▼] | Accounts assigned to Basket Tag should be allocated before accounts that are not assigned to Basket Tag. |
| ISHPRI | [2 ▼] ← E | Deals with older start dates, still under collateralized, should be allocated before accounts that have earlier start dates. |
| MARDED | [4 ▼] | Accounts with closed Markets should be allocated before accounts with open markets. |
| SHPRIO | [3 ▼] | Deals with lower priority, still under collateralized, should be allocated before accounts with higher priority. |

Section 2 - Parameter that decide which collateral should be allocated or left over in the Dealer Box when there is excess.

| | | |
|---|---|---|
| BTMRGN | [01 ▼] | Priority assigned to the use of Better Margins compared to the Cost of Carry. |
| COSCAR | [01 ▼] | Priority assigned to the use of the Cost of Carry Profile compared to the Better Margin option. |

Instruction Allocation Server
DLRID ⊙ [XXXX ▼]    Parent Dealer ID
SUBMIT [ALWAYS ▼] ← F    When should the CPO changes be submitted

[Close This Window]    [Reset] ← G    [Preview] ← H

| BNY Mellon - Broker Dealer Services - GCM - Customers | | |
|---|---|---|
| Modify V3 CPO Allocation Template | | |

Template Name XXXX XXX XXXX — B

Pre - Optimization Phase
MINMOD    YES          Minimum Modifications made to Accounts associated with MINMOD tag.

Optimization Phase
FFSFAC    NO           Forced Fussy Factor controls how strictly the previous option (FUSFAS) should be enforced.
FULREP    NO           Full Replacement controls the number of passes that would run in Full Replacement Algorithm.
FUSFAC    25           Fussy Factor controls the percentage of a position that get's allocated in each iteration.
IMNMOD    NO           Include Minimum Modification (MINMOD) flagged accounts in Replacement Algorithm.
MXNOPOS   YES          The Maximum Number of Positions that can be used for allocation.
REPSRT    NONE         Should the Replacement algorithm run the Deals with older start date option (ISHPRI) or the Deals with a lower priority option (SHPRIO).
RETRY     2            Number of times to Retry Optimization & Post-Optimization Phases.

Post - Optimization Phase
Section 1
BASKET    1            Accounts assigned to Basket Tag should be allocated before accounts that are not assigned to Basket Tag.
ISHPRI    2            Deals with older start dates, still under collateralized, should be allocated before accounts that have earlier start dates.
MARDED    0            Accounts with closed Markets should be allocated before accounts with open markets.
SHRPIO    3            Deals with lower priority, still under-collateralized, should be allocated before accounts with higher priority.

Section 2
BTMRGM    0            Priority assigned to the use of Better Margins compared to the Cost of Carry.
COSCAR    4            Priority assigned to the use of the Cost of Carry Profile compared to the Better Margin option.

Instruction Allocation Server
DLRID     XXXX         Parent Dealer ID
SUBMIT    ALWAYS       When should the CPO changes be submitted Close This Window    [ Cancel ]    [ Confirm ]

| AllocID | Allocate To | Source | Mode | Type | Status | Open ID | Event Date Time | Number of Deals | Deals Done |
|---|---|---|---|---|---|---|---|---|---|
| 60023 | XXX | XXX | T | CPO Allocation | IN PROGRESS | XXX | 03/12/2010 16:32:47 | 312 | 0 |
| 59887 | XXX | XXX | T | CPO Allocation | DONE | XXX | 03/12/2010 12:42:39 | 1 | 1 |
| 59820 | XXX | XXX | T | CPO Allocation | DONE | XXX | 03/12/2010 11:55:19 | 14 | 14 |
| 59755 | XXX | XXX | T | CPO Allocation | DONE | XXX | 03/12/2010 11:09:29 | 312 | 301 |
| 59751 | XXX | XXX | T | CPO Allocation | ABORT | XXX | 03/12/2010 11:09:07 | 312 | 0 |
| 59748 | XXX | XXX | T | CPO Allocation | ABORT | XXX | 03/12/2010 11:07:58 | 312 | 0 |
| 59697 | XXX | XXX | T | CPO Allocation | DONE | XXX | 03/12/2010 10:31:29 | 5 | 5 |
| 59678 | XXX | XXX | T | CPO Allocation | DONE | XXX | 03/12/2010 10:21:11 | 5 | 5 |
| 59656 | XXX | XXX | T | CPO Allocation | DONE | XXX | 03/12/2010 10:15:03 | 16 | 16 |
| 59647 | XXX | XXX | T | CPO Allocation | DONE | XXX | 03/12/2010 10:14:09 | 5 | 5 |
| 59565 | XXX | XXX | T | CPO Allocation | DONE | XXX | 03/12/2010 09:29:19 | 311 | 300 |
| 59476 | XXX | XXX | T | CPO Allocation | DONE | XXX | 03/12/2010 08:37:10 | 19 | 19 |
| 59424 | XXX | XXX | T | CPO Allocation | DONE | XXX | 03/12/2010 07:54:21 | 1 | 1 |
| 59343 | XXX | XXX | T | CPO Allocation | DONE | XXX | 03/12/2010 07:02:13 | 3 | 3 |
| 59296 | XXX | XXX | T | CPO Allocation | DONE | XXX | 03/12/2010 06:06:24 | 321 | 310 |
| 59216 | XXX | XXX | T | CPO Allocation | DONE | XXX | 03/12/2010 04:38:08 | 16 | 16 |
| 59153 | XXX | XXX | T | CPO Allocation | DONE | XXX | 03/12/2010 03:54:28 | 3 | 3 |

SYSTEM AND METHOD FOR OPTIMIZING COLLATERAL MANAGEMENT

This application claims benefit to U.S. Provisional Application Ser. No. 61/438,195, filed Jan. 31, 2011, incorporated herein in its entirety by reference.

BACKGROUND

This application is directed to a computer-implemented system and method useful for managing collateral associated with Repurchase Agreements ("Repos"). In particular, this application is directed to a computerized system and method for efficiently allocating the collateral managed by a third party agent (a "Tri-Party agent") in Tri-Party Repos.

In a Repo, a seller (dealer/borrower/cash receiver) sells securities for cash to a buyer (lender/cash provider) and agrees to repurchase those securities at a later date for more cash. The Repo rate is the difference between borrowed and paid back cash expressed as a percentage. The buyer typically utilizes Repos to invest cash for an agreed upon duration of time (typically overnight, although the term may vary), and would receive a rate of interest in return for the investment. The seller typically utilizes Repos to finance long positions in securities or other assets in the seller's portfolio.

Repos are financial instruments used in money markets and capital markets, and are economically similar to a secured loan, with the buyer receiving securities as collateral to protect against default. Virtually any security may be employed in a Repo, including, for example, Treasury or Government bills, corporate and Treasury/Government bonds, stocks/shares, or other securities or financial instruments. In a Repo, however, the legal title to the securities clearly passes from the seller to the buyer, or "investor". Coupons (installment payments that are payable to the owner of the securities), which are paid while the Repo buyer owns the securities are, in fact, usually passed directly onto the Repo seller. This may seem counterintuitive, as the ownership of the collateral technically rests with the buyer during the Repo agreement. It is possible to instead pass on the coupon by altering the cash paid at the end of the agreement, though this is more typical of Sell/Buy Backs.

Although the underlying nature of a Repo transaction is that of a loan, the terminology differs from that used when talking of loans because the seller does actually repurchase the legal ownership of the securities from the buyer at the end of the agreement. Although the actual effect of the whole transaction is identical to a cash loan, in using the "repurchase" terminology, the emphasis is placed upon the current legal ownership of the collateral securities by the respective parties.

In a Tri-Party Repo, the collateral is managed by a Tri-Party agent (typically a bank), who may match the details of the trade agreed upon by the buyer and the seller, and assume all of the post trade processing and settlement work. The Tri-Party agent controls the movement of securities, such that the buyers do not actually take delivery of collateralized securities. The Tri-Party agent acts as a custodian for the collateral, and allows the flow of collateral and cash between buyers and sellers across one or more deals.

In some Repo agreements, the seller/dealer may have numerous assets that are being managed by the Tri-Party agent. In these cases, it may be desirable for the Tri-Party agent to allow for the restructuring of the collateral of the deals, so that the seller may free up some assets while placing other agreeable assets in the legal ownership of the buyer, during the deal. Such movements would generally be agreed to by the buyer and the seller when entering the agreement to be managed by the Tri-Party agent.

Among other things, what is needed is a system and method for managing collateral in financial transactions. What is further needed is a computer-implemented system and method that simplifies and improves the allocations of collateral associated with Tri-Party Repos in a dealer's portfolio.

SUMMARY

Through various embodiments described herein, the system and method of this disclosure enhances the allocations of collateral associated with a plurality of Repo agreements. For example, various embodiments provide functions relating to determining overcollateralization and undercollateralization across the Repos, and ascertaining enhanced or optimal restructuring of the collateral associated with the Repos, to satisfy the requirements of the deal, and the preferences of those participating in the deal.

Various embodiments of this disclosure may be used in conjunction with existing financial services platforms, for example the Bank of New York Mellon's Tri-Party repurchase agreement products (RepoEdge®) which allow clients to outsource the operational aspects of their collateralized transactions, and Derivatives Margin Management (DM Edge®), which helps clients manage credit risks associated with derivatives transactions by enabling them to accept, monitor and re-transfer collateral. These services, among others such as Repo Margin Management (RM Edge®), MarginDirect$^{SM}$, and Derivatives Collateral Net (DCN), may be delivered to clients through AccessEdge$^{SM}$, a real-time, web-based portal.

The operator/manager of the system and method of this disclosure acts as a third-party service provider to the two principals to a trade, and the various functions performed by the system and method provide value-added services which mitigate risk and lead to greater efficiencies for both parties.

According to an embodiment, a system for managing collateral allocations in one or more Tri-Party repurchasing agreements includes one or more processors and one or more memory elements coupled to the one or more processors. The one or more memory elements are configured to at least store deal attributes including rulesets associated with the buyer, and one or more collateral characteristics for collateral provided by the seller that are associated with each of the Tri-Party repurchasing agreements. The system further includes at least one collateral allocation module, configured through the one or more processors to recall collateral originally associated with the one or more Tri-Party repurchasing agreements into a common dealer box. The collateral allocation module is further configured to identify under-collateralized ones of the one or more Tri-Party repurchasing agreements, and identify, using a self organizing map and one or more of the rulesets and the collateral characteristics, groups of the collateral. The collateral allocation module additionally is configured to sort said groups of collateral such that smaller average margins are given a higher priority while larger average margins are given a lower priority, and assign the groups of collateral from the common dealer box to each of the one or more Tri-Party repurchasing agreements in order from the higher priority to the lower priority, to collateralize said Tri-Party repurchasing agreements. Furthermore, the collateral allocation module is configured to replace at least a portion of the collateral assigned to the one or more Tri-Party repurchasing agreements based on the self organizing map, to collateralize a maximal number of the one or more Tri-Party repurchasing agreements with remaining collateral in the dealer box and/or collateral assigned to the one or more Tri-Party repurchasing agreements.

According to another embodiment, a computer-implemented method for allocating collateral for one or more Tri-Party repurchasing agreements includes providing one or more processors and one or more memory elements coupled to the one or more processors, configured to at least store deal attributes including rulesets associated with the buyer, and one or more collateral characteristics for collateral provided by the seller that are associated with each of the Tri-Party repurchasing agreements. The method also includes recalling, via the one or more processors, collateral originally associated with the one or more Tri-Party repurchasing agreements into a common dealer box. The method additionally includes identifying, via the one or more processors, under-collateralized ones of the one or more Tri-Party repurchasing agreements, and identifying, using a self organizing map and one or more of the rulesets and the collateral characteristics, groups of the collateral. The method further includes sorting, via the one or more processors, said groups of collateral such that smaller average margins are given a higher priority while larger average margins are given a lower priority. Furthermore, the method includes assigning the groups of collateral from the common dealer box to each of the one or more Tri-Party repurchasing agreements in order from the higher priority to the lower priority, to collateralize said Tri-Party repurchasing agreements. The method additionally includes replacing at least a portion of the collateral assigned to the one or more Tri-Party repurchasing agreements based on the self organizing map to collateralize a maximal number of the one or more Tri-Party repurchasing agreements with remaining collateral in the dealer box and/or collateral assigned to the one or more Tri-Party repurchasing agreements.

The system and method of this disclosure provides various capabilities as discussed more fully in the detailed description below.

BRIEF DISCUSSION OF THE DRAWINGS

FIG. 1 provides a functional block diagram of an embodiment of a computer-implemented and networked system for collateral management;

FIG. 3 illustrates an example of reallocations of securities throughout the operation of the optimization algorithm;

Figure 7:
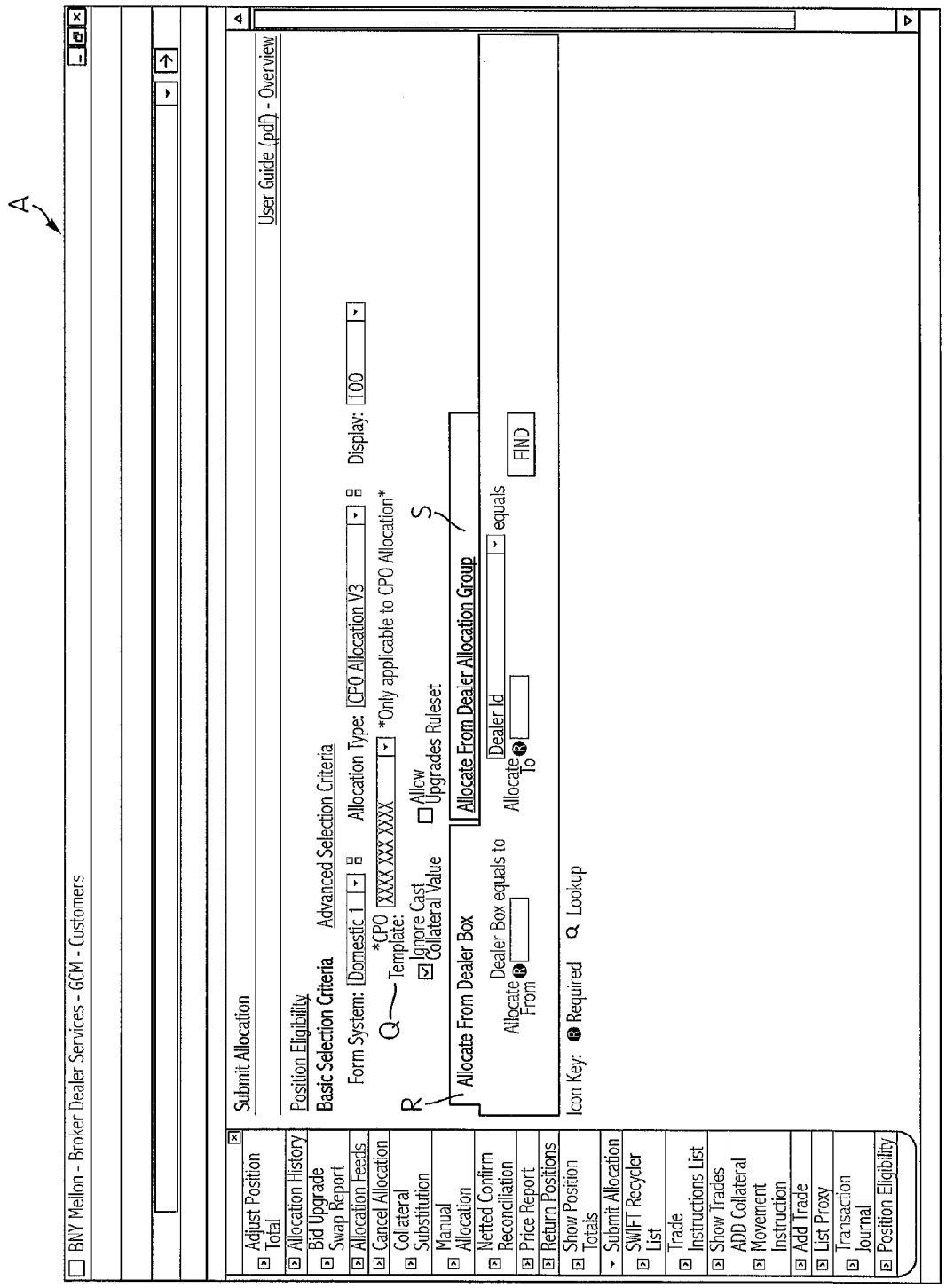

FIG. 4 provides an illustrative screen shot representing an allocation template modification screen that may be used in a graphical user interface of an embodiment of this disclosure;

FIG. 5 provides an illustrative screen shot representing an allocation template review screen that may be used in a graphical user interface of an embodiment of this disclosure;

Figure 6:
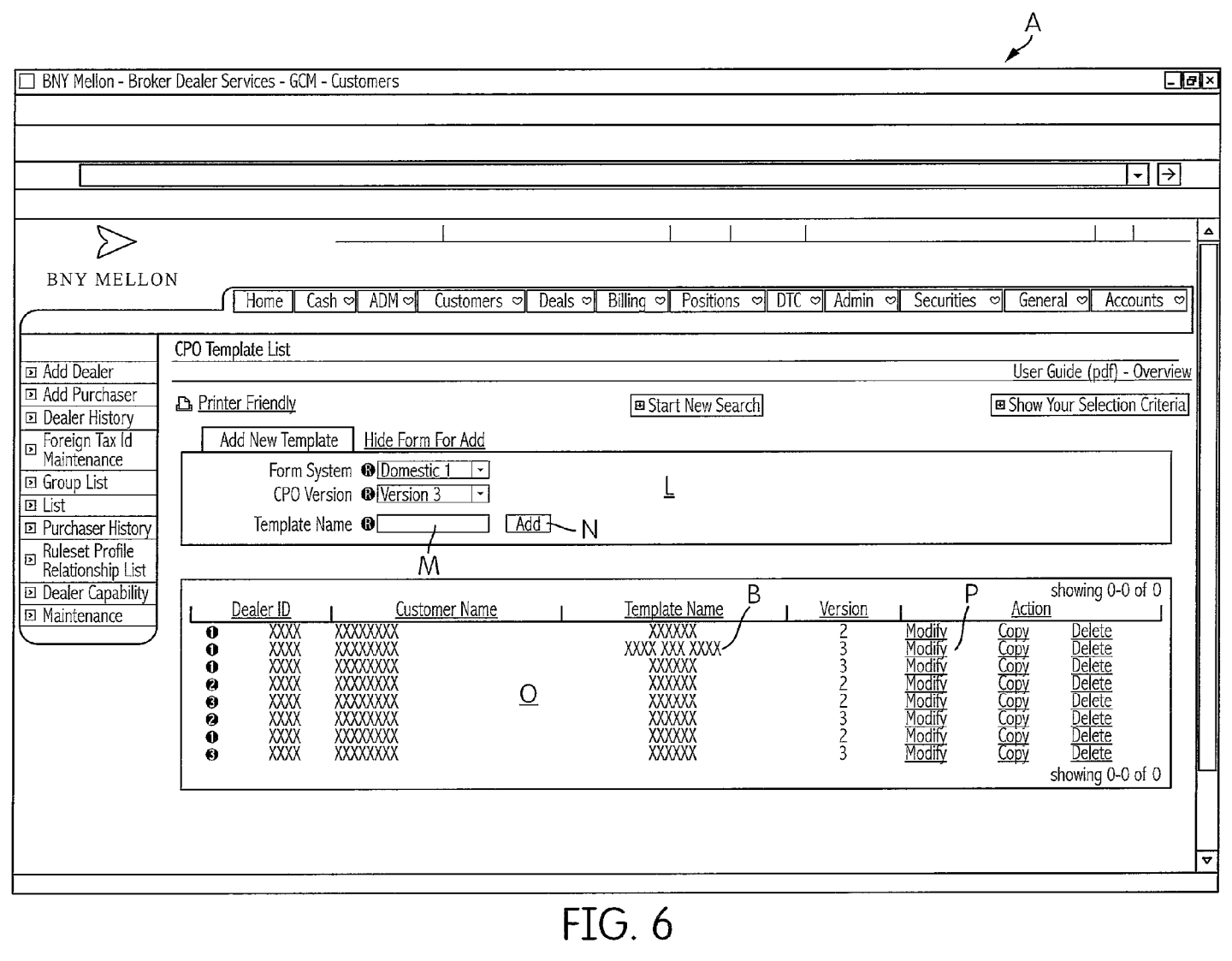

FIG. 6 provides an illustrative screen shot representing an allocation template list screen that may be used in a graphical user interface of an embodiment of this disclosure;

FIG. 7 provides an illustrative screen shot representing an allocation submission screen that may be used in a graphical user interface of an embodiment of this disclosure;

Figure 8:
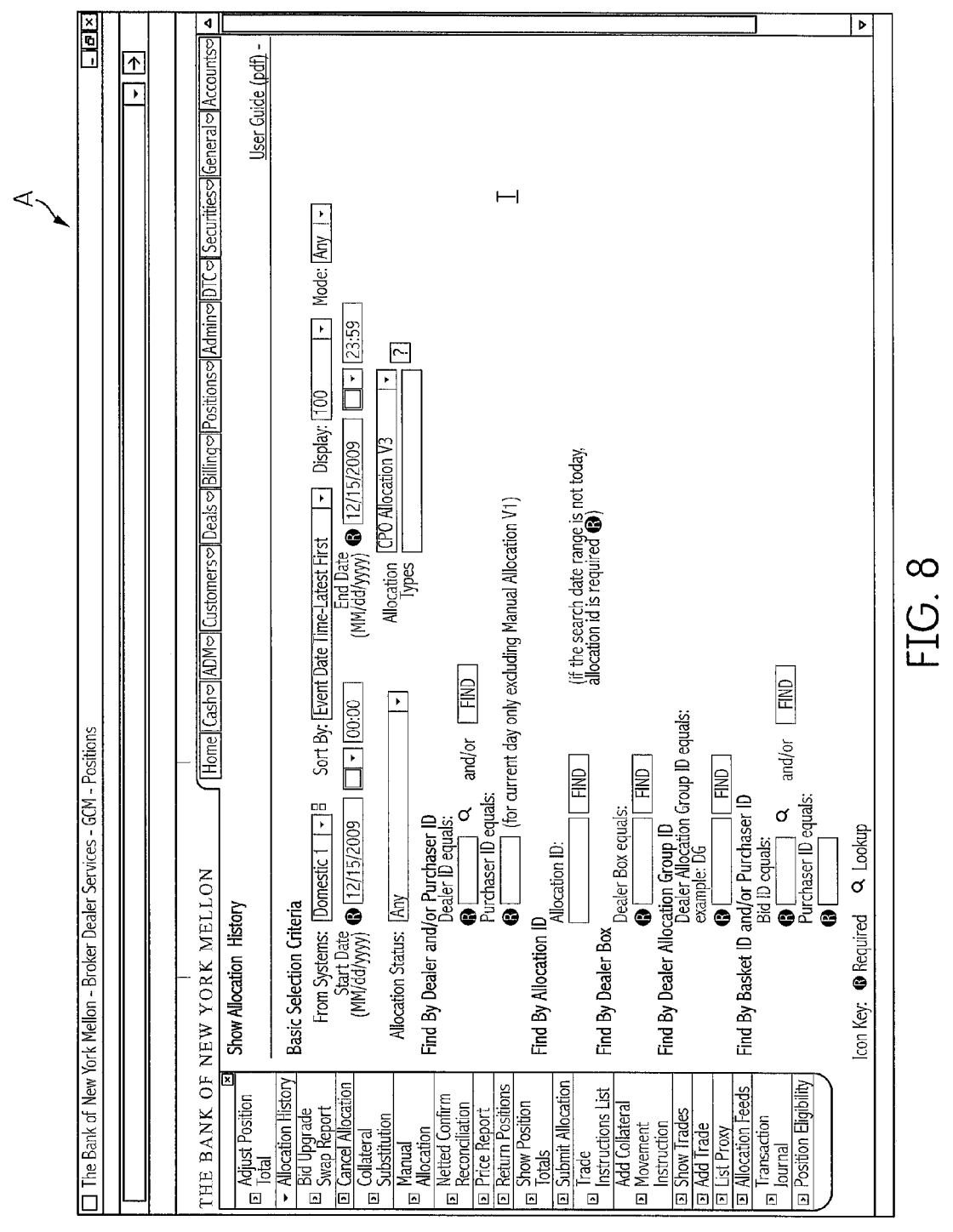

FIG. 8 provides an illustrative screen shot representing an allocation history search screen that may be used in a graphical user interface of an embodiment of this disclosure;

FIG. 9 provides an illustrative screen shot representing an allocation history search results screen that may be used in a graphical user interface of an embodiment of this disclosure; and FIG. 10 provides an illustrative screen shot representing an allocation history detail report screen that may be used in a graphical user interface of an embodiment of this disclosure.

DETAILED DESCRIPTION

In the discussion of various embodiments and aspects of the system and method of this disclosure, examples of a processor may include any one or more of, for instance, a personal computer, portable computer, personal digital assistant (PDA), workstation, or other processor-driven device, and examples of network may include, for example, a private network, the Internet, or other known network types, including both wired and wireless networks.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Described herein is an exemplary algorithm which may be implemented through computer software running in a processor to determine optimal collateral allocations based on user-selected criteria. This algorithm is not intended to be limiting, but is merely provided to describe one way of accomplishing the functions associated with determining optimal collateral allocations.

In the discussion of various embodiments and aspects of the system and method of this disclosure, examples of trading parties include, but are not limited to, broker-dealers, institutional investors, and hedge fund managers.

In various embodiments, a web-based collateral management system or platform links dealers with investors to conduct collateral transactions in a safe, efficient, and reliable way. Online dealers and investors can manage collateral among a diverse range of instruments, including Tri-Party repo agreements in all major currencies, securities lending transactions, municipal deposits, bank loans, derivatives transactions, letters of credit, and structured trades, for example. The system may be managed by the Tri-Party agent, and may additionally provide, for example, daily mark-to-market valuations, haircuts/margins, and concentration limits (i.e., maintain percentages of market capitalization, dollar amount limits for a particular security, or a percentage of the portfolio in a particular security, for example), as well as manage, track, and settle collateral transactions across global capital markets by working collaboratively with clients to provide collateral transparency. The enhanced collateral allocation aspect of this disclosure may allow dealers (i.e. the sellers in Repos) to control and/or automatically permit the shifting of collateral associated with a plurality of deals that are under the management of the Tri-Party agent, even though the collateral is titled to the buyers in the Repo. Such transfers may "optimize" the allocations, so, for example, the fewest number of deals are under-collateralized or over-collateralized, while the collateral allocations meet buyer and/or seller requirements for the deals, as described in greater detail below.

Figure 1:
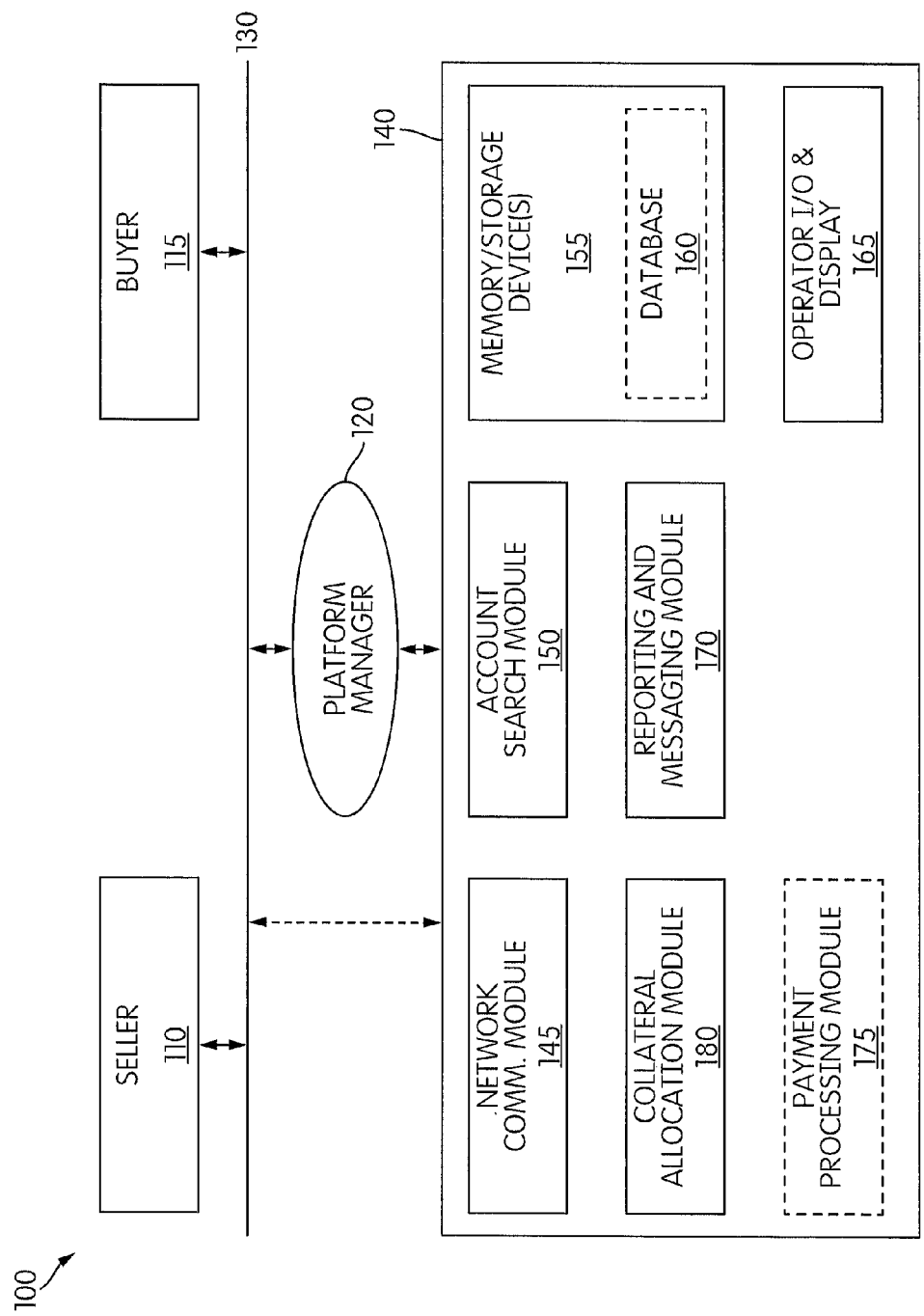

FIG. 1 illustrates a functional block diagram of an embodiment of post-trade management system 100. Post-trade management system 100 is established to permit seller 110 and buyer 115 to access collateral management system 140 via network 130 and platform manager 120, or optionally bypasses platform manager 120. Collateral management system 140 may utilize one or more processors (not shown), housed within one or more computers, which may be networked together by any appropriate mechanism, including, for example, network 130. The one or more processors are configured to run one or more modules, as described below. For example, the modules of collateral management system 140 may include network communication module 145, configured to process external communications between collateral management system 140 and network 130. Account search module 150 may be configured to search one or more databases associated with client assets held in custody for, or for the benefit of various existing clients of platform manager 120. Account search module 150 may be configured to search for a particular type of security or asset, a particular security issuer, or a security rating, for example. In some embodiments, account search module 150 may be configured to access memory storage device(s) 155, which may include one or more databases 160 therein. Memory, storage device 155 may be any type of conventional storage mechanism for example, one or more hard drives, solid state drives, network storage, random access memory (RAM), combinations thereof, or so on. Database 160 may be any type of appropriate database, as would be known by a person of ordinary skill in the art, for example. Operator input/output and display module 165 represents various techniques and computer peripheral devices for providing operator input and output to collateral management system 140. In some embodiments, operator input/output and display module 165 may communicate with network communication module 145, to provide seller 110 and/or buyer 115 with remote access to collateral management system 140 via network 130.

Collateral management system 140 may additionally include reporting and messaging module 170, which may be configured to provide standard and/or custom report and messaging formats that may be transferred to network 130 by collateral management system 140, (optionally) through platform manager 120, or through an alternate communications path illustrated by the dashed double-ended arrow in FIG. 1. In some embodiments, collateral management system 140 may include payment processing module 175, indicated in dashed lines, which may have optional functionality associated with business payment activities for services rendered by the system manager (i.e. the third party agent) in processing, evaluating, and optimizing reallocation of collateral for managed deals such as the Tri-Party Repos. As further shown in FIG. 1, and described in greater detail below, collateral management system 140 further includes collateral allocation module 180, which may be configured to us the one or more processors to evaluate various security positions that are being utilized as collateral for a Repo deal, or may be eligible to be utilized in a Repo deal, and ascertain the allocations of the security positions across a plurality of Repo deals.

Figure 2A:
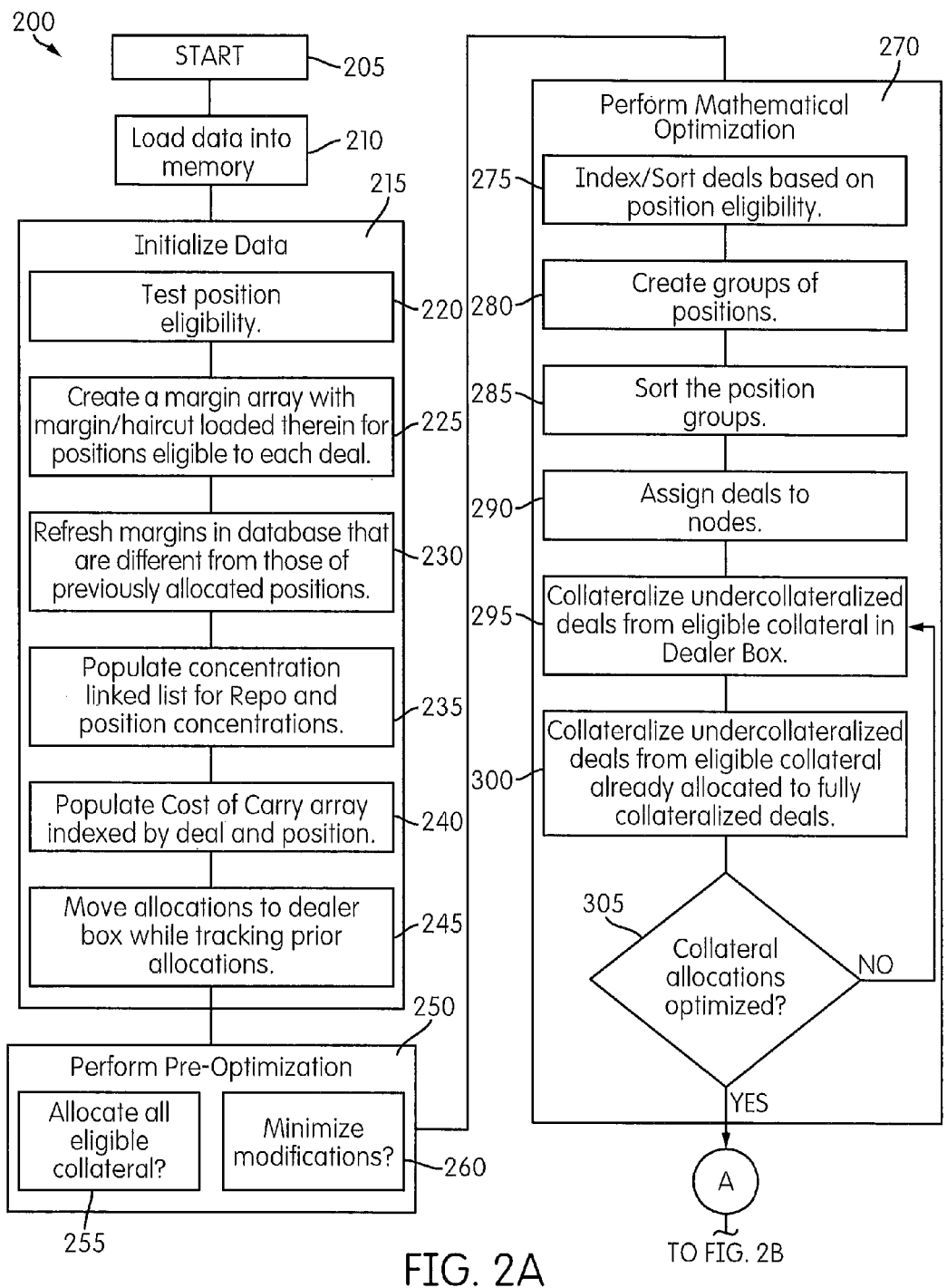
FIGS. 2A-2B illustrate a logic flowchart that implements a collateral allocation optimization algorithm and other rules relating to collateral allocation in an embodiment of this disclosure.

FIG. 2A depicts a flowchart illustrating an embodiment of a method/process of collateral allocation (process 200), which may be configured to optimize or otherwise enhance or make more efficient the allocations of collateral across a plurality of the Repo deals. In some embodiments, process 200 may be implemented by one or more algorithms which may be configured to operate in collateral allocation module 180. Although reference herein will be made to elements of post-trade management system 100 described above, in other embodiments, process 200 may be operable through another such system, or over a plurality of systems. Process 200 starts at 205, and continues to 210 where data associated with the collateral allocation is loaded into memory. In an embodiment, the data may be read from database 160. In an embodiment, the data may be copied from the database residing on a durable storage medium to a faster access storage medium (i.e. from a hard drive to random access memory). In various embodiments, the data may include one or more of Tri-Party repo deals, positions, security data, rulesets, concentration limit data, or so on. In an embodiment, application locks may be read into the memory as well, so as to prevent duplicate allocations from running simultaneously. In an embodiment, the data may be responsive to a query implemented on account search module 150. For example, in some embodiments, the data may be narrowed to include data involving a particular buyer 115, or a particular class of collateral, as described in greater detail below. In an embodiment, the data loaded at 210 may be over-inclusive, so to minimize access of database 160, which may otherwise increase network latency when memory/storage device(s) 155 are located away from the one or more processors. In an embodiment, each of a plurality of processors may be associated with only a subset of the deals to manage primarily that subset, however data corresponding to all deals may be loaded into memory associated with each processor, to balance the load of processing said data, regardless of any interrelatedness of the data. For example, in an embodiment wherein process 200 is operable on a clustered computing architecture, each of a plurality of message passing interface (MPI) nodes may be responsible for a subset of the deals returned by the query.

Once the data is loaded at 210, process 200 may continue to initialize the data at 215. Data initialization at 215 may be configured to structure the data in a manner that may permit greater efficiency of data handling further in process 200. For example, data initialization at 215 may include at 220 performing eligibility testing of the positions against the rulesets, basket identifier (BID) schedules, and collateral preference schedules (CPS) for all relevant deals. In an embodiment, only the MPI nodes responsible for a given subset of the deals will test eligibility for those deals. In an embodiment, each node may process multiple deals in parallel, using, for example, an OpenMP architecture. Data initialization at 215 may further include at 225 creating a margin array data structure, such that non-eligible positions for a given deal will have a margin of zero, while eligible positions will have their margin or haircut loaded into the structure. In an embodiment, the margin array may be a double array indexed by repo number and position number, however may be stored as a single contiguous area of memory. In an embodiment, different parts of the margin array may be populated by different MPI nodes, however may be synchronized across the cluster of MPI nodes. In an embodiment, deals sharing a group level concentration limit are grouped onto the same node so that concentration limit data does not have to be communicated through the cluster to help improve performance. In an embodiment, a load balancing algorithm is used to authorize a node as manager of a specific deal so that each node in the cluster has an equal work load.

Data initialization at 215 may further include at 230 refreshing the margins in database 160 for any margin of the array that is different from previously allocated margins loaded into memory at 210. Such differences may arise, for example, due to changes in security data or rulesets. At 235, data initialization continues with populating a concentration linked list for Repo and position combinations. Such a list may permit allocation and de-allocation of positions by iterating through the linked list to update concentration buckets without reparsing the ruleset to identify applicable concentration limits. In an embodiment, concentrations that were not correctly populated in database 160 for previously allocated positions are refreshed in database 160. Data initialization at 215 may further include at 240 populating a Cost of Carry array, which may be a double array indexed by deal and position. In an embodiment, the Cost of Carry array may be populated by MPI nodes managing their associated deals, and then synchronized across the cluster of MPI nodes. Data initialization at 215 may further include at 245 taking a snapshot of a previous allocation, then returning all previously allocated positions back to a Dealer Box in the memory.

Once data initialization at 215 is completed, process 200 may continue at 250 by performing pre-optimization of the positions for the deals. Such pre-optimization may allow selection of various features for particular deals, which may override optimized or otherwise enhanced allocations performed later in process 200. In an embodiment, pre-optimization at 250 may include at 255 allocating all collateral that is eligible for a given deal to that deal, even if the deal becomes over-collateralized. In an embodiment, any collateral allocated to those deals may be locked, and not utilized for other optimizations. In an embodiment, pre-optimization at 250 may include at 260 a minimum modification feature, which may be associated with a given deal such that an attempt would be made to reallocate any collateral previously allocated to that deal (i.e. indicated in the backup snapshot at 245) back to the deal. In an embodiment, if the position is no longer eligible, would break a concentration limit, or would over-collateralize that deal, then that position might not be allocated, or might be partially allocated. In an embodiment, any position allocated to the deals designated for minimum modification would not be accessed for optimization, or otherwise reallocated for the remainder of process 200. In an embodiment, the deals selected for minimum modification may still have additional positions allocated to it to prevent under-collateralization. For example, if the account is short, additional collateral may be allocated to the deal. Furthermore, if the account is over-collateralized, some collateral may be removed, but not enough to make the account under-collateralized. Again, any collateral already allocated would remain collateral; however this may exclude collateral that is no longer eligible collateral, if the rulesets for the deal are modified. In an embodiment, the allocations during the pre-optimization at 250 may utilize a parallel replacement algorithm, described in greater detail below.

Once the pre-optimization phase at 250 is complete, process 200 may continue with mathematically optimizing the collateral allocations at 270, where the one or more processors may be used to find an allocation of the portfolio that minimizes current required collateral across the plurality of deals. In an embodiment, seller 110 and buyer 115 may agree to allow such movements of the collateral in their deals, either automatically or at the request of one or both parties. Typically, as seller 110 has agreed to buy back the collateral at a later time, seller 110 would be the one who would want to shift collateral, so that additional collateral may be freed up which may be utilized for other purposes. In an embodiment, the mathematical optimization at 270 may also utilize the parallel replacement algorithm, again described below, which may be iterated repeatedly until the portfolio comes fully collateralized, or when the derivative of the weighted average of the previous ten iterations becomes zero or negative.

The mathematical optimization at 270 may include, at 275, indexing and sorting the deals based on position eligibility. In an embodiment, a bipartite graph may be created between the set of positions and the set of deals. Edges may be drawn showing eligibility between the sets of positions and deals. In an embodiment, vertex degrees are calculated for each set, representing the number of edges connecting to each member of the set. In an embodiment, the sorting may include sorting the set by vertex degree, such that repo accounts may subsequently be collateralized in the increasing order of their vertex degrees. Such collateralization may allow allocation of positions which have lower eligibility.

Mathematical optimization at 270 may further include at 280 creating groups of positions, which may be utilized to parallelize the allocation process. In an embodiment, a self organizing map (SOM)/Kohonen map, or other similar neural network technique may be utilized to create the groups. The SOM may use vectors of margins for individual positions as inputs to train the network in a learning mode. A mapping mode may then classify a new input vector. In an embodiment, the SOM algorithm may utilize the Euclidian Distance formula to categorize and group the positions. In an embodiment, the vectors may include the margins for a position applied to each deal. Once the positions are grouped at 280, the position groups may then be sorted at 285. In an embodiment where the best use of margins is the basis for enhancement/optimization, sorting the position groups at 285 may comprise ordering the groups according to the average margins of positions within the group. In an embodiment, the SOM algorithm may be configured to split the position into a number of categories. In an embodiment, the number of categories may be equal to the number of MPI nodes. In some embodiments, the SOM algorithm may ensure that positions in the same category would have similar margins across all associated deals.

As an example, if the margins for each position within each Repo Account (RA) corresponds to what is reflected in Table I below, then when the positions are grouped and sorted as reflected in Table II, the groups may be ordered such that the group with the lowest margins has higher priority in allocation, as follows:

TABLE I

Position Margins

| | Repo Accounts | | | | | | | |
|---|---|---|---|---|---|---|---|---|
| Positions | RA1 | RA2 | RA3 | RA4 | RA5 | RA6 | RA7 | RA8 |
| 023824574 | 1.01 | 1.02 | 1.01 | 1.01 | 1.00 | 1.02 | 1.01 | 1.01 |
| 024519660 | 1.05 | 1.05 | 0.00 | 1.06 | 0.00 | 1.04 | 1.05 | 1.05 |
| 024814742 | 1.01 | 1.02 | 0.00 | 1.01 | 1.00 | 1.02 | 1.01 | 1.01 |
| 025088212 | 1.02 | 1.02 | 1.01 | 1.01 | 1.01 | 1.02 | 1.01 | 1.01 |
| 026104335 | 1.06 | 1.06 | 1.07 | 1.05 | 0.00 | 1.06 | 1.05 | 0.00 |
| 026649103 | 1.01 | 1.02 | 1.02 | 1.03 | 1.01 | 0.00 | 1.01 | 1.01 |

TABLE II

Group sorting

| | Position Groups | | | | | |
|---|---|---|---|---|---|---|
| | Group 1 (G1) | | Group 2 (G2) | | Group3 (G3) | |
| Repo Accounts | 23824574 | 24814742 | 25088212 | 26649103 | 26104335 | 24519660 |
| RA1 | 1.01 | 1.01 | 1.02 | 1.01 | 1.06 | 1.05 |
| RA2 | 1.02 | 1.02 | 1.02 | 1.02 | 1.06 | 1.05 |
| RA3 | 1.01 | 0.00 | 1.01 | 1.02 | 1.07 | 0.00 |
| RA4 | 1.01 | 1.01 | 1.01 | 1.03 | 1.05 | 1.06 |
| RA5 | 1.00 | 1.00 | 1.01 | 1.01 | 0.00 | 0.00 |
| RA6 | 1.02 | 1.02 | 1.02 | 0.00 | 1.06 | 1.04 |
| RA7 | 1.01 | 1.01 | 1.01 | 1.01 | 1.05 | 1.05 |
| RA8 | 1.01 | 1.01 | 1.01 | 1.01 | 0.00 | 1.05 |
| Position Avg | 1.01 | 1.01 | 1.01 | 1.02 | 1.06 | 1.05 |
| Group Avg | 1.01 | | 1.01 | | 1.05 | |
| Sort Order | 1 | | 2 | | 3 | |

In an embodiment, where two groups have the same average margins (such as G1 and G2 in the example of Table II), then the group having positions with the lower eligibility may be awarded the higher priority. In some embodiments, once the groups are sorted at 285, the mathematical optimization at 270 may continue with assigning the deals among nodes at 290. In some embodiments, the deals are assigned to groups as part of loading the data at 210. Such assignment may be performed to parallelize the collateral allocation process. In an embodiment, a deal or a group of deals may be assigned to a particular node based on maximum/minimum concentration limits. As noted above, in some embodiments the deals may be balanced to the MPI nodes, which in some cases may account for group level concentration limits, whereby deals sharing a group level concentration limit are assigned to the same node, while other deals are split across the remaining nodes. In an embodiment, only the MPI node managing a particular deal would allocate collateral to that deal, while any MPI node could de-allocate collateral from a given deal. In an embodiment, the number of nodes would equal the number of position groups for maximum efficiency. In an embodiment, the position groups may be rotated across the MPI nodes so that all nodes have an opportunity to allocate any position from any position group. In an embodiment, the position groups are assigned to a node using pipeline architecture to ensure that lowest margin collateral are considered first for allocation. An example of such allocation is depicted in Table III below.

TABLE III

Pipeline Architecture Allocation

| | Time-cycles | | | | |
|---|---|---|---|---|---|
| | T1 | T2 | T3 | T4 | T5 |
| Node 1 | G1 | G2 | G3 | | |
| Node 2 | | G1 | G2 | G3 | |
| Node 3 | | | G1 | G2 | G3 |

Once the groups are sorted in order of their vertex degrees, and in various embodiments assigned to particular nodes, the mathematical optimization at 270 may continue at 295 by performing a maximal allocation. In an embodiment, the maximal allocation may comprise sorting Repo Accounts by ascending order of vertex degree, based on positions in the Dealer Box. The maximal allocation may continue by sorting the sorted Repo Accounts by the vertex degree based on position in an Allocated Securities Box (although in the first iteration of the maximal allocation at 295, the Allocated Securities box would be empty). Maximal allocation at 295 would continue with the position groups being arranged such that those with the lowest average of margins are allocated first.

Following the maximal allocation at 295, some of the RAs may be left undercollateralized, with some collateral still left in the Dealer Box. A replacement procedure may be implemented at 300 to swap some of the collateral in the fully collateralized repo accounts with the remaining eligible collateral in the Dealer Box, and reallocate the freed up collateral to the undercollateralized deals. As above, eligibility may be ascertained by any appropriate mechanism, including but not limited to allowance by buyer 115 in rulesets associated with the deals, preference by seller 110 through the BID schedule, or so on. In an embodiment, the reallocation may again give greater importance to the margins. In an embodiment, the replacement procedure at 300 may comprise sorting the RAs first by vertex degree based on the positions left in the Dealer Box, then by vertex degree based on the positions now in the Allocated Securities box. During the replacement allocations, securities in the Dealer Box would be considered first, before securities in the Allocated Securities box. The undercollateralized accounts would continue to be collateralized with securities from the Allocated Securities box, once the eligible collateral in the Dealer Box is depleted. In an embodiment, the replacement procedure at 300 may be iterated across all accounts until all accounts are fully collateralized, or there is a shortage of collateral. In an embodiment, the replacement procedure at 300 may utilize the bipartite graph method to establish priorities for the replacement collateralization.

An example of the mathematical optimization performed at 270 is depicted in FIG. 3, wherein the complete collateralization of all Repo Accounts R1-R8 is accomplished in three iterations (Iter 0, Iter 1, and Iter 2). For each iteration, the number of securities allocated (SA) to a given account is presented, as well as the number of eligible securities in both the Dealer Box (DB) and the number of eligible securities in the Allocated Securities box (AS). As shown, the order that the Repo Accounts are presented following the replacement procedure reflects the order in which the Repo Accounts are collateralized during that procedure: ascending in order based on the number of eligible securities in the DB, followed by the number of eligible securities in the AS, (or R6→R8→R2→R7→R4→R1→R5→R3). When making the collateral available, it would be in the reverse order, starting with what is left in the DB (i.e.

DB→R3→R5→R1→R4→R7→R2→R8→R6). For example, when allocating collateral to account R6 in Iter 2, the collateral considered first will be the eligible collateral in the DB (sorted internally by margins) followed by the eligible collateral that was allocated to R3 (sorted internally by margins) in Iter 1, followed by R5 in Iter 1, and so on. By proceeding in this manner, collateral is being taken from accounts that still have a large amount of eligible collateral left in the Dealer Box, before moving on to taking collateral from Repo Accounts that have more limited amounts of eligible collateral.

A stopping point for the mathematical optimization at 270 may be determined by any suitable determination criteria. In an embodiment, the mathematical optimization at 270 may simply proceed for a predetermined number of iterations. In another embodiment the stopping point for the mathematical optimization at 270 may be ascertained from a moving average calculated from the prior iterations. As shown in the illustrated embodiment of process 200 in FIG. 2A, after the replacement process is run at 300, it may be determined at 305 if an optimal collateral allocation has been ascertained. If not, then the mathematical optimization at 270 may continue by returning to 295 for further collateral reallocations. In an embodiment, the optimal collateral allocation may be selected from the processed iterations of the replacement process 300 at a stopping point for the optimization calculations. An example of ascertaining the optimal collateral allocations at 305 is depicted in the example collateralization table presented in Table IV.

TABLE IV

Optimized Collateralizations for a given Repo Account

| Iteration # | Undercollateralized Amount | Moving Avg (From Prior Ten Iterations) | Slope (From Prior Ten Moving Averages) |
|---|---|---|---|
| 1 | 51,724,121,266.26 | | |
| 2 | 15,285,759,313.30 | | |
| 3 | 15,275,400,741.39 | | |
| 4 | 15,265,605,535.34 | | |
| 5 | 15,263,662,725.20 | | |
| 6 | 15,263,496,654.97 | | |
| 7 | 15,196,739,680.91 | | |
| 8 | 15,193,430,765.45 | | |
| 9 | 15,183,291,443.73 | | |
| 10 | 15,183,267,729.92 | 18,883,477,585.65 | |
| 11 | 15,174,152,224.71 | 15,228,480,681.49 | |
| 12 | 15,181,803,807.26 | 15,218,085,130.89 | |
| 13 | 15,184,771,409.55 | 15,209,022,197.70 | |
| 14 | 15,185,985,755.57 | 15,201,060,219.73 | |
| 15 | 15,177,743,295.89 | 15,192,468,276.80 | |
| 16 | 15,188,312,786.22 | 15,184,949,889.92 | |
| 17 | 15,178,028,120.29 | 15,183,078,733.86 | |
| 18 | 15,182,510,080.73 | 15,181,986,665.39 | |
| 19 | 15,194,587,124.58 | 15,183,116,233.47 | −3,700,361,352.17 |
| 20 | 15,189,709,194.54 | 15,183,760,379.94 | −44,720,301.56 |
| 21 | 15,179,768,127.28 | 15,184,321,970.19 | −33,763,160.69 |
| 22 | 15,177,527,310.43 | 15,183,894,320.51 | −25,127,877.19 |
| 23 | 15,179,533,232.17 | 15,183,370,502.77 | −17,689,716.95 |
| 24 | 15,184,357,609.62 | 15,183,207,688.18 | −9,260,588.62 |
| 25 | 15,172,461,886.99 | 15,182,679,547.29 | −2,270,342.64 |
| 26 | 15,178,898,307.02 | 15,181,738,099.37 | −1,340,634.49 |
| 27 | 15,171,085,519.12 | 15,181,043,839.25 | −942,826.14 |
| 28 | 15,168,148,512.90 | 15,179,607,682.46 | −3,508,551.01 |
| 29 | 15,177,237,711.56 | 15,177,872,741.16 | −5,887,638.77 |
| 30 | 15,171,969,148.08 | 15,176,098,736.52 | −8,223,233.68 |
| 31 | 15,168,954,314.80 | 15,175,017,355.27 | −8,876,965.24 |
| 32 | 15,169,906,453.98 | 15,174,255,269.62 | −9,115,233.15 |
| 33 | 15,175,691,281.00 | 15,173,871,074.51 | −9,336,613.67 |
| 34 | 15,185,598,578.23 | 15,173,995,171.37 | −8,684,375.92 |
| 35 | 15,171,045,961.44 | 15,173,853,578.81 | −7,884,520.55 |
| 36 | 15,175,794,410.25 | 15,173,543,189.14 | −7,500,650.11 |

TABLE IV-continued

Optimized Collateralizations for a given Repo Account

| Iteration # | Undercollateralized Amount | Moving Avg (From Prior Ten Iterations) | Slope (From Prior Ten Moving Averages) |
|---|---|---|---|
| 37 | 15,164,822,445.27 | 15,172,916,881.75 | −6,690,800.71 |
| 38 | 15,175,593,402.76 | 15,173,661,370.74 | −4,211,370.42 |
| 39 | 15,171,130,798.57 | 15,173,050,679.44 | −3,048,057.08 |
| 40 | 15,175,304,543.67 | 15,173,384,219.00 | −1,633,136.27 |
| 41 | 15,174,472,655.12 | 15,173,936,053.03 | −319,216.59 |
| 42 | 15,172,036,275.24 | 15,174,149,035.16 | 277,960.65 |

As shown in Table IV, in an embodiment a weighted average of the undercollateralized amount may be calculated from the previous ten iterations of the replacement process at 300. The "undercollateralized amount" indicates the amount by which the account is undercollateralized at the end of the maximal allocation process at 295. The Replacement algorithm at 300 attempts to collateralize this amount by swapping eligible collateral between RAs and the Dealer Box, before allocating the collateral to the given RA. The slope may then be calculated, representing the difference between the current iteration's weighted average and the weighted average of the tenth prior iteration. In an embodiment, the stopping point may be ascertained when this slope becomes greater than or equal to zero. In Table IV, the stopping point is reached with iteration 42, where the slope becomes positive. The optimal allocation, having the least undercollateralized amount, may then be selected from the calculated iterations, which in the example of Table IV is found in iteration 37.

During the swapping of collateral, it may be observed that the replacement algorithm at 300 continues to run iteratively despite there not being any eligible collateral available in any of the accounts. In an embodiment, instead of a set number of iterations being run, as was depicted in Table IV, the optimized collateral allocation determination at 305 may detect when the collateralization value has become constant, indicating a lack of further eligible collateral, recognizing that as a termination point. In an embodiment, the optimized collateral allocation determination at 305 may ascertain that the iteration should terminate when the under-collateralized amount becomes zero. In an embodiment, if the moving average value over ten iterations remains constant or increases, the allocation may be ascertained at 305 to be complete. The moving average may be a greater determination of optimal collateralization, because in cases where larger collateral is swapped for smaller collateral, the under-collateralized amount value may increase for that particular iteration, however, this may decrease again in subsequent iterations, and it may be desirable to continue the iterations of the replacement process at 300.

Figure 2B:
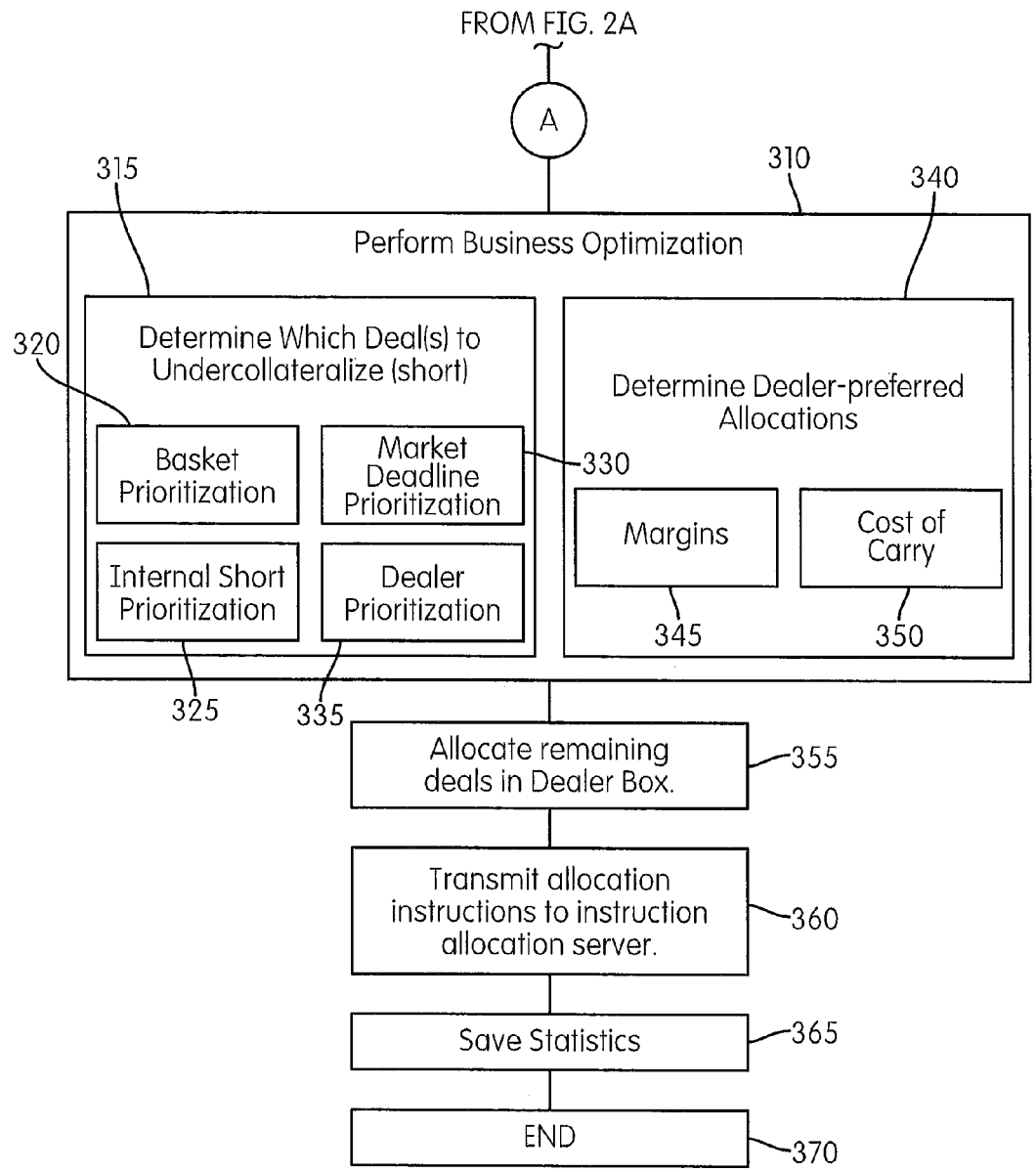

Once it is determined at 305 that the collateral allocations have been mathematically optimized, the mathematical optimization at 270 may end, and process 200 may continue to A, which continues at FIG. 2B. As is shown in FIG. 2B, process 200 may continue at 310 with a business optimization of the collateral. In an embodiment, the business optimization at 310 may be implemented if there is insufficient collateral to collateralize the entire portfolio. In an embodiment, a determination of which deal or deals should be left undercollateralized may be made at 315. In an embodiment, multiple considerations may exist, which may be used together and prioritized by seller 110 and specified via operator I/O & display 165, as described in greater detail below. In an embodiment, one such consideration may include basket prioritization 320. Basket prioritization 320 may prioritize deals classified as basket trades or having BID schedules over deals that are not classified as basket trades, or do not have BID schedules. In an embodiment, another such consideration may include internal short prioritization 325. Internal short prioritization 325 may collateralize older deals ahead of newer deals. In an embodiment, another consideration may include market deadline prioritization 330. Such market deadline prioritization 330 may prioritize deals that accept collateral only from markets which are closed ahead of deals that only accept collateral from markets which are still open. In yet another embodiment, another consideration may include dealer prioritization 335, wherein the dealer (i.e. seller 110) may specify particular deals to have a higher prioritization. Again, such demarcation of higher priority deals may be specified via operator I/O & display 165, or any other interface with the collateral allocation system running process 200. The implementation of the undercollateralization determination at 315 may be by any suitable mechanism, including but not limited to via the parallel replacement mechanism of the mathematical optimization described above.

As further shown, the business optimization at 310 may further include at 340 determining which of a dealer's preferred collateral should be allocated to a deal. The dealer's preferred collateral may be of any appropriate type, and may correspond, for example, to the dealer's BID schedule, and the intersection of the BID schedule with the deal's ruleset (which may specify the collateral acceptable to buyer 115). In an embodiment, any collateral that is allocated with a higher cost of carry may be swapped with eligible collateral still in the Dealer Box that has a lower cost of carry. In an embodiment, any collateral that is allocated with a higher margin may be swapped with eligible collateral still in the Dealer Box that would have a lower margin. In an embodiment wherein deals are associated with particular MPI processes, deals may be processed in parallel using shared memory programming within the same MPI node. In an embodiment, for each Repo deal managed by an MPI process, priority may be established as either by margins 345 or by Cost of Carry 350. For each deallocation position equal to the position DESC (in SQL syntax) that is allocated to the deal, and for each allocation position equal to the allocation ASC (in SQL syntax) that is available in the Dealer Box, the dealer preferred collateral determination at 340 may include breaking out of the position DESC and position ASC loops if the allocation position is equivalent to the deallocation position. Otherwise, the determination algorithm may comprise deallocating the deallocation position, allocating the allocation position, and trying to fully collateralize the deal with the position that was deallocated. If the deallocation position was fully removed, the loop over all MPI nodes may end. In prioritizing by margin at 345, if a position is eligible for two different deals, if there is a lower margin in one deal, it should be allocated to that deal so that fewer positions are used to collateralize the portfolio. In prioritizing by Cost of Carry at 350, seller 110 may analyze the collateral from a risk/desirability standpoint, determining which collateral is the cheapest to deliver, and how they believe the collateral's value will change during the course of the deal.

Although in some embodiments, other business optimizations may be included in the business optimization at 310, in an embodiment process 200 may continue at 355 with a final allocation of deals in the Dealer Box. In an embodiment, these final allocations at 355 may be utilized to collateralize the portfolio of deals if there are any positions in the Dealer Box after both the mathematical optimizations at 270 and the business optimizations at 310. In an embodiment, the parallel replacement algorithm may again be utilized for the final allocations at 350.

In an embodiment, process 200 may continue with a submission of allocation instructions at 360. For example, in an embodiment the current allocations that were tracked at 245 may be compared with the optimized portfolio calculated in process 200. The differences between the pre-optimized allocations at 245 and the newly optimized allocations may be forwarded to a separate instruction allocation server, which may utilize instructions from a collateral optimization server, such as collateral management system 140, to implement the optimized instructions across the deals. In an embodiment, removal of positions that shouldn't be allocated would be performed by the instruction allocation server first, followed by a reallocation of collateral to new deals. In an embodiment, if there exists an instruction where the position cannot be allocated due to eligibility, concentration limits, or so on, the instruction server may update database 160 or another storage construct with the reason for the failure. In an embodiment, the instruction allocation server may then perform the remaining position movements, collateralizing the deal associated with the erroneous instruction at a later time.

In some embodiments, the instruction allocation server may be configured to perform position movements so as to minimize financial exposure to the Tri-Party agent, or other similar party. As an example, where collateral is removed from multiple accounts before being reallocated, the Tri-Party agent would be exposed for the entire uncollateralized amount over the multiple accounts. However if the collateral were reallocated from some of the accounts to others of the accounts prior to removing collateral from those other accounts, the exposure to the Tri-Party agent would be reduced. As such, in some embodiments the movements of collateral may be ordered to minimize shortage. As shown in the simplified example of Table V, the Tri-Party agent would be exposed by the value of each collateral removed from a given deal.

TABLE V

Example Position Movements to Minimize Shortage/Exposure

| | Scenario A | | Scenario B | |
|---|---|---|---|---|
| Movement | Allocation | Aggregate Shortage/ Exposure Amount | Allocation | Aggregate Shortage/ Exposure Amount |
| 1 | Remove Collateral X from Account A | Collateral for A | Remove Collateral X from Account A | Collateral for A |
| 2 | Remove Collateral Y from Account B | Collateral for A and | Allocate Collateral X to Account B | Collateral for A |

TABLE V-continued

Example Position Movements to Minimize Shortage/Exposure

| | Scenario A | | Scenario B | |
|---|---|---|---|---|
| Movement | Allocation | Aggregate Shortage/Exposure Amount | Allocation | Aggregate Shortage/Exposure Amount |
| 3 | Allocate Collateral X to Account B | Collateral for B Collateral for A | Remove Collateral Y from Account B | Collateral for A |
| 4 | Allocate Collateral Y to Account A | NONE | Allocate Collateral Y to Account A | NONE |

In Scenario A, between steps 2 and 3, the Tri-Party agent would be exposed by the value of collateral owed to Account A plus the value of collateral owed to Account B. In Scenario B, however, by allocating Collateral X to Account B immediately after removing it from Account A, Account B is never shorted, reducing the exposure to the Tri-Party agent. In more complicated embodiments, where collateral is being reallocated over and between a greater number of accounts, any number of determination criteria may be utilized to ascertain the order of deallocation and reallocation, to reduce exposure to the Tri-Party agent. In some embodiments, multiple movements may be processed together (i.e. as a single transaction), which may also reduce or eliminate exposure to the Tri-Party agent. For example, if Movements 1-4 of either Scenario A or Scenario B were performed as a single transaction, then there would not be any exposure to the Tri-Party agent, as the account holders would never see a shortage to the deals in their accounts. In some such embodiments, an automatic cash crediting system for providing credit from the Tri-Party agent to shorted accounts may calculate at a transaction level, comparing differences in exposure at the start of the transaction to the end of the transaction.

Returning to FIG. 2B, in some embodiments, statistics regarding the data initialization at 215, and/or the optimized allocations calculated in process 200 may be saved at 365. In an embodiment, the save may be made to durable memory, such as memory/storage device(s) 155 of collateral management system 140. In an embodiment, the statistics may be recorded to database 160. As noted, such statistics may include collateralization failures, however may also include any other information calculated during process 200, including but not limited to data regarding margins and cost of carry. Finally, process 200 may end at 370.

As indicated above, in an embodiment optimization may include consideration of BID schedules. In an embodiment wherein there is insufficient collateral for a given deal, upgrades may also be considered for the deals. For example, in an embodiment a CPS (or an "upgrade" schedule) may be utilized to prioritize collateral allocation. In an embodiment, the eligibility of collateral may be simply indicated in the margin array. In an embodiment, during the dealer preferred allocations 340 of the business optimizations at 310, collateral with a high cost of carry (determined by the CPS) may be swapped with collateral of a lower cost of carry, which would utilize the CPS in a descending direction. In an embodiment, the CPS may determine eligibility of collateral in the ascending direction, while dealer preferred collateral may be ascertained by reading the CPS in the descending direction.

In an embodiment, if a given deal reaches a specified maximum number of positions, an extra check may be performed after allocating each position. In an embodiment, if the number of positions equals the maximum allowable position count, and if the current required collateral of the deal is greater than zero, then the smallest allocated position may be removed, which may allow for the potential of a larger position to be allocated.

As noted above, in an embodiment, the parallel design of the computation of the deals is appreciated, wherein various memory locks may be implemented to prevent multiple processes from allocating positions to the deal. In an embodiment, however, any MPI process may be configured to remove any position from any deal, regardless of whether the specific MPI process is responsible for managing that deal. In an embodiment, groups of RAs may be allocated using a pipeline architecture, such that in a first time-cycle, a first node will process a first group G1, while in a subsequent time-cycle, the first node will process a second group G2, while a second node will process the first group G1. Such grouping of positions may allow multiple MPI processes to allocate in parallel, preventing multiple processes from allocating the same position at the same time. In an embodiment, the grouping of positions may permit allocation of the lowest average margin positions, which can reduce the number of positions used to collateralize the portfolio of deals. In an embodiment, the positions are synchronized across the MPI nodes between each time-cycle allowing each MPI node to know the current state of all positions in the group it is about to allocate from in the next time-cycle.

The system and method of this disclosure may be implemented in various ways. For example, as noted above, access to collateral management system 140 may be provided via operator I/O & display 165. In an embodiment, operator I/O & display 165 may be accessible over network 130, such that seller 110 and/or buyer 115 may have access to collateral allocation module 180, for example. In an embodiment illustrated in the "screenshot" of FIG. 4, graphical user interface (GUI) indicated generally by Letter "A" may be provided to facilitate such access to collateral management system 140. As shown, a GUI "A" may allow creation or modification of an allocation template identified at Letter "B", which may permit a user of GUI "A" to establish preferences for process 200 to optimize collateral allocations. At Letter "C", pre-optimization options may be established. In an embodiment, the pre-optimization options may correspond with the pre-optimization at 250. In the illustrated embodiment, pre-optimization options "C" for allocation template "B" permit selectively enabling the minimize modifications features 260, which again would attempt to reallocate any collateral previously allocated to a given set of deals. In an embodiment, different accounts and/or deals that are added or controlled over post-trade management system 100 may selectively be associated with a minimum modification (MINMOD) tag, such that if the minimize modifications feature 260 is enabled in pre-optimization options "C", the collateral allocation module 180 would attempt to retain the collateral as allocated to those accounts.

Optimization options for mathematical optimization 270 in allocation template "B" may be controlled at Letter "D". As shown, a number of features are controllable in the illustrated embodiment. For example, in an embodiment, a Fussy Factor may be presented, giving a user of the GUI "A" the ability to establish a percentage of a position that is allocated in each iteration of the optimization. A Forced Fussy Factor option may control how strictly the Fussy Factor is enforced. In an embodiment, a Full Replacement option may be presented to control the number of passes that may be run in a full replacement algorithm for the optimization. An option may be presented to selectively include MINMOD tagged accounts in the replacement procedure at 300. Furthermore, it may be selected that the replacement algorithm at 300 may run the deals with an older stat date option, or a lower priority option. Another option presented in the optimization options "D" may include a number of times to retry the optimization and/or post-optimization phases (i.e. mathematical optimization 270 and business optimization 310).

At Letter "E" options for the business optimization at 310 are presented. As shown, there may be separate sections for both the determining of which deals to short at 315, and the determining dealer-preferred allocations at 340. As shown, the user of GUI "A" may prioritize from basket prioritization 320, internal short prioritization 325, market deadlines 330, and dealer priority at 335. Again, for basket prioritization at 320, accounts assigned to a basket tag should be allocated before accounts not assigned to a basket tag. With internal short prioritization 325, deals with older state dates, still undercollateralized, would be allocated before accounts with earlier start dates. In market deadline prioritization 330, accounts with closed Markets would be allocated before accounts with open markets. In dealer prioritization 320, undercollateralized deals with lower priority would be allocated before accounts with higher priority. In the dealer-preferred allocations at 340, the options presented in some embodiments may include assigning a priority to use better margins compared to the cost of carry. Likewise, a priority may be assigned to use a cost of carry profile as compared to a better margin profile.

Although the options depicted in letters "C", "D" and "E" are presented as drop-down lists that permit selection of "Yes," "No," numerical elements (such as for prioritization or percentages) and so on, other graphical user interface elements may also or alternatively be utilized in GUI "A". For example, a series of push buttons or radio buttons may be presented to make the applicable options selections. Furthermore, in some embodiments a text based interface (or a text base element in a GUI) may be utilized, allowing a user to type in an applicable response to an option prompt. In some embodiments, combinations of GUI and text elements may be utilized. For example, at Letter "F", instructions for the instruction allocation server are input. As shown, the applicable Dealer ID (identifying seller 110, for example) is a text interface, while a "submit" dropdown box allows for a constant, intermittent, or delayed submission of the optimization instructions to the instruction allocation server.

Shown at letter "G" is a pushbutton that would reset the values input at letters "C" through "F" to default values. Such default values may be, for example, all "NO" responses, all "YES" responses, zeroed numerical prioritizations, or so on. In an embodiment, the default values implemented by the reset pushbutton "G" may be the most commonly implemented response for each optimization element. Pushbutton "H" is a submission pushbutton, configured to accept the responses established for allocation template "B". As shown, pushbutton "H" is a preview pushbutton, which would advance the user to a summary page depicted in the screenshot of FIG. 5. As seen in FIG. 5, a reporting of the selections made for allocation template "B" is presented at Letter "I", allowing a user of GUI "A" to review his or her responses. If an error has been made in a response, a cancel pushbutton is provided at Letter "J", returning the user to the screen depicted in FIG. 4, allowing editing of allocation template "B". In an embodiment, all responses in made previously to allocation template "B" will remain, so that a user need only change the source of the error. If the allocation template review at "I" is correct, a confirmation pushbutton is provided at letter "K", saving the allocation template responses. In an embodiment, the name identifying application template "B", by which the template responses may be saved under, is established prior to accessing the options for allocation template "B". In other embodiments, a space to label or otherwise demark a template name for the optimization configurations may be provided either in the editing screen of FIG. 4, the preview report of FIG. 5, or following confirmation through pushbutton "K". Clicking of the confirmation button "K" may in an embodiment save the selected options in memory/storage device(s) 155. In an embodiment, the selected options may be recorded in database 160, and may be associated with some or all deals for associated with seller 110. In an embodiment seller 110 may run the optimization for deals associated with a particular buyer 115, or a series of buyers 115 all associated with the Tri-Party agent.

In an embodiment, a portion of GUI "A" may allow for a listing of previously created templates, and the ability to create new templates. In FIG. 6, a new template may be added at Letter "L", wherein a template name may be input in the textbox at letter "M". After clicking on the add button at Letter "N", the allocation template editing screen of FIG. 4 may be presented, and would ultimately be saved under the specified template name. As further shown in FIG. 6, previous templates may be listed at Letter "O", along with the option of modifying the templates, copying the options from the template into a new template having a new name, or deleting the templates. In the illustrated embodiment, allocation template "B" appears on the list, wherein clicking the modify button indicated at Letter "P" would return to the view of FIG. 4.

As illustrated in FIG. 7, in an embodiment a portion of GUI "A" may provide user input to apply the settings of an allocation template, such as allocation template "B" established in FIG. 4, to optimize collateral allocations from the Dealer Box. As shown, the allocation template may be selected at Letter "Q". In the illustrated embodiment, the allocation template is selected by a dropdown box, however in other embodiments the allocation template may be searched for, identified by a text-box, or by any other suitable mechanism. In the illustrated embodiment, allocation template "B" established in FIG. 4 is selected in the dropdown box at Letter "Q". As shown, in an embodiment the allocations may be performed by designating a particular Dealer Box, and a particular Dealer ID, as is shown generally at Letter "R". In other embodiments a dealer allocation group may be selected or otherwise designated to submit an allocation, as may be selected by clicking on the tab indicated at Letter "S".

FIG. 8 illustrates that in an embodiment, after an allocation is submitted the status of the allocation may be presented through a portion of GUI "A". As shown, the allocation may be searched by a number of associated criteria presented generally at Letter "T", including but not limited to allocation date, allocation status, allocation type, Dealer or Purchaser ID, allocation ID, Dealer Box, dealer allocation group, basket ID, combinations thereof, or so on. In the illustrated embodiment, basic selection criteria that includes at least a date range for the allocations may be combined with more particular selection criteria (i.e. the dealer/purchaser IDs, the allocation ID, the Dealer Box, the dealer allocation group, or the Basket/Purchaser IDs) when searching an allocation history. By entering the associated search information and clicking the find buttons "U", the associated allocations may be presented, such as is depicted in FIG. 9.

In the embodiment of GUI "A" depicted in FIG. 9, the allocations associated with the search terms entered at Letter "T" in FIG. 8 are presented, and may include at Letter "V" the status of the optimization process described above. As shown, in an embodiment, the status of completed optimizations may be indicated as "done", while "in progress" may designate that an optimization is under way for the associated allocation ID. Also shown is that certain allocations may be designated as "abort", which may indicate the failure of the allocation procedure. In an embodiment, clicking on the "abort" indicator may present information as to the reason for the abortion of the optimization procedure, such as an improper ruleset configuration, a computer failure, a time-out, or so on. In an embodiment, selecting the allocation ID indicated generally at Letter "W" from the allocation history results illustrated in FIG. 9 may provide a detailed description page, such as that depicted in FIG. 10.

Figure 10:
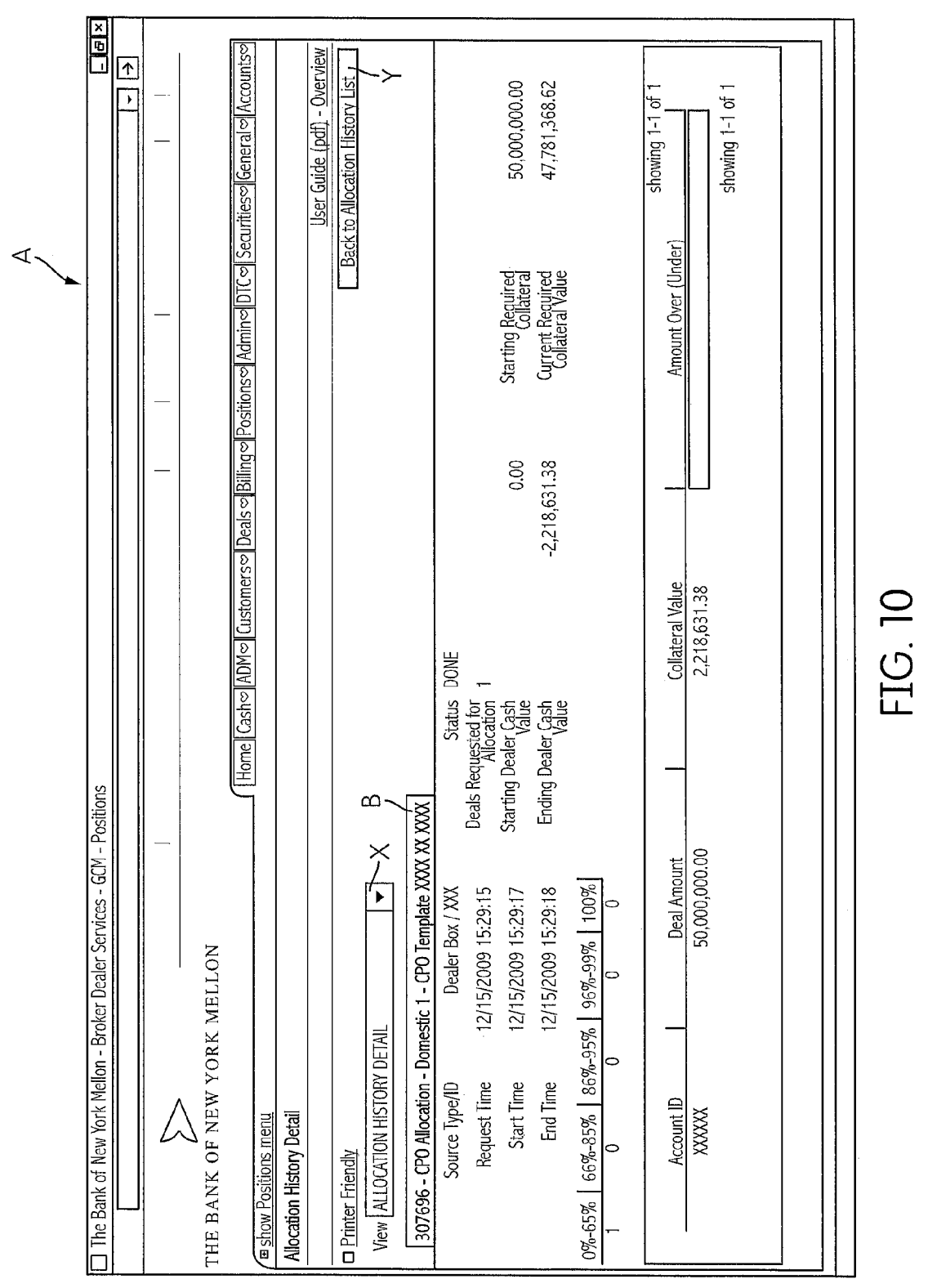

FIG. 10 illustrates a detailed description page of GUI "A", which may correspond to the allocation ID "W" selected in FIG. 9. As shown, the allocation template utilized for the selected allocation (which in the illustrated embodiment is allocation template "B" established in FIG. 4) may be listed, as well as the associated report for the allocation. As shown, a dropdown box "X" may provide different types of report data associated with the allocation. For example, in the illustrated embodiment, the initial screen may indicate the current amount of collateral associated with or needed in the selected allocation. In an embodiment, other reports may also or alternatively be provided, such as by selecting a different report type from the dropdown box "X". In an embodiment, the reports may include a list of the allocated positions by the Cost of Carry. For example, the report may allow comparison based on account ID, security ID, ID type, depository, Dealer Box, par, collateral value, CPS ruleset, and/or the Cost of Carry number. In an embodiment, the reports may be for all positions, including unallocated positions. In an embodiment, the weighted average of the Cost of Carry for the allocated positions may be provided, where the weight is determined by the size of the positions. In an embodiment, the positions that indicate zero Cost of Carry (i.e. the Cost of Carry could not be derived) are presented, so that a user may determine a gap in their schedule designations (i.e. in the CPS) that prevents complete prioritization. In an embodiment, the weighted margins for the account(s) are presented, to indicate the excess in collateral provided for a given account. Other reports are possible, and the reports described above are provided solely as examples of how data may be presented to users, so that users may use the GUI "A" to determine if or how to best make associated collateralization decisions. As further shown in FIG. 10, once a user of GUI "A" is fished viewing the allocation reports, they may press the button "Y" that may return them to the allocation history list of FIG. 9.

The above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A system for managing collateral allocations in one or more Tri-Party repurchasing agreements, the system comprising:
    one or more processors;
    one or more memory elements coupled to the one or more processors and configured to at least store deal attributes including rulesets associated with the buyer, and one or more collateral characteristics for collateral provided by the seller that are associated with each of the Tri-Party repurchasing agreements;
    at least one collateral allocation module, configured through the one or more processors to:
        recall collateral originally associated with the one or more Tri-Party repurchasing agreements into a common grouping of collateral eligible to be allocated,
        identify under-collateralized ones of the one or more Tri-Party repurchasing agreements;
        identify, using a self organizing map and one or more of the rulesets and the collateral characteristics, groups of the collateral within the common grouping of collateral eligible to be allocated;
        sort said groups of the collateral such that smaller average margins are given a higher priority while larger average margins are given a lower priority;
        assign the sorted groups of collateral from the common grouping of collateral eligible to be allocated to each of the one or more Tri-Party repurchasing agreements in order from the higher priority to the lower priority in an amount sufficient to collateralize said Tri-Party repurchasing agreements; and
        replace at least a portion of the collateral assigned to the one or more Tri-Party repurchasing agreements based on the self organizing map to collateralize the one or more Tri-Party repurchasing agreements with remaining collateral in the common grouping of collateral eligible to be allocated and/or collateral assigned to the one or more Tri-Party repurchasing agreements.

2. The system of claim 1, wherein the collateral allocation module is user configurable to designate at least a portion of the collateral to be reallocated back to the originally associated one or more Tri-Party repurchasing agreements.

3. The system of claim 1, wherein the at least one collateral allocation module is further configured through the one or more processors to determine, based on a user input, any deals to undercollateralize if insufficient collateral is available for all Tri-Party repurchasing agreements.

4. The system of claim 3, wherein the determination is based on one or more of a basket schedule, a market deadline, an internal short prioritization, and a dealer prioritization.

5. The system of claim 4, wherein the collateral allocation module is configured to receive a priority ranking for the one or more of the basket schedule, the market deadline, the internal short prioritization, and the dealer prioritization.

6. The system of claim 1, wherein the at least one collateral allocation module is further configured through the one or more processors to determine, based on a user input, which deals to prioritize in collateralization, based on a weighting of margins and cost of carry.

7. The system of claim 1, wherein, the at least one collateral allocation module is configured to process at least some of the collateral and/or the one or more Tri-Party repurchasing agreements in parallel across the one or more processors.

8. The system of claim 7, wherein the at least one collateral allocation module is configured to match collateral to the one or more Tri-Party repurchasing agreements via vertex degrees in a bipartite graph created between a set of positions in the collateral and a set of one or more of the Tri-Party repurchasing agreements.

9. The system of claim 1, further comprising a user interface is operatively coupled to the one or more processors via a network connection.

10. The system of claim 9, wherein the user interface comprises an Internet web portal.

11. The system of claim 1, wherein the one or more processors comprises a plurality of interfaced processors, and wherein the at least one collateral allocation module is further configured to synchronize at least a portion of the collateral characteristics among the plurality of interfaced processors to prevent different ones of the plurality of interfaced processors from simultaneously replacing the same portion of the collateral.

12. A computer-implemented method for allocating collateral for one or more Tri-Party repurchasing agreements, the method comprising:
  recalling, via one or more automated programmed computer processors coupled to one or more memory elements configured to at least store deal attributes including rulesets associated with the buyer and one or more collateral characteristics for collateral provided by the seller that are associated with each of the Tri-Party repurchasing agreements, collateral originally associated with the one or more Tri-Party repurchasing agreements into a common grouping of collateral eligible to be allocated;
  identifying, via the one or more automated programmed computer processors, under-collateralized ones of the one or more Tri-Party repurchasing agreements;
  identifying, via the one or more automated programmed computer processors, and using a self organizing map and one or more of the rulesets and the collateral characteristics, groups of the collateral within the common grouping of collateral eligible to be allocated;
  sorting, via the one or more automated programmed computer processors, said groups of the collateral such that smaller average margins are given a higher priority while larger average margins are given a lower priority;
  assigning the groups of collateral from the common grouping of collateral eligible to be allocated to each of the one or more Tri-Party repurchasing agreements in order from the higher priority to the lower priority in an amount sufficient to collateralize said Tri-Party repurchasing agreements; and
  replacing at least a portion of the collateral assigned to the one or more Tri-Party repurchasing agreements based on the self organizing map to collateralize the one or more Tri-Party repurchasing agreements with remaining collateral in the common grouping of collateral eligible to be allocated and/or collateral assigned to the one or more Tri-Party repurchasing agreements.

13. The method of claim 12, further comprising providing a user-input for designating some of the collateral to be reallocated back to the originally associated one or more Tri-Party repurchasing agreements.

14. The method of claim 12, further comprising determining, based on a user input, which deals may remain undercollateralized when there is insufficient collateral for all tri-party repurchasing agreements.

15. The method of claim 14, wherein the determining is based on one or more of a basket schedule, a market deadline, an internal short prioritization, and a dealer prioritization.

16. The method of claim 15, wherein the determining further comprising weighing a priority ranking for the one or more of the basket schedule, the market deadline, the internal short prioritization, and the dealer prioritization.

17. The method of claim 12, further comprising determining, based on a user input, which deals to prioritize in collateralization, based on a weighting of margins and cost of carry.

18. The method of claim 12, wherein at least some of the collateral and/or the one or more Tri-Party repurchasing agreements are processed in parallel across the one or more processors.

19. The method of claim 18, wherein said assigning comprises matching collateral to the one or more Tri-Party repurchasing agreements via vertex degrees in a bipartite graph, created between a set of positions in the collateral and a set of one or more of the Tri-Party repurchasing agreements.

20. The method of claim 12, wherein the one or more processors comprises a plurality of interfaced processors, and wherein the method further comprises synchronizing at least a portion of the collateral characteristics among the plurality of interfaced processors to prevent different ones of the plurality of interfaced processors from simultaneously replacing the same portion of the collateral.

\* \* \* \* \*